United States Patent
Hecking

(10) Patent No.: US 6,613,201 B1
(45) Date of Patent: *Sep. 2, 2003

(54) APPARATUS FOR TREATING WATER BY MEANS OF AN ELECTRIC FIELD

(75) Inventor: Willi Hecking, Mönchengladbach (DE)

(73) Assignee: Hans Sasserath & Co KG (DE)

( * ) Notice: Subject to any disclaimer, the term of this patent is extended or adjusted under 35 U.S.C. 154(b) by 188 days.

This patent is subject to a terminal disclaimer.

(21) Appl. No.: 09/637,186

(22) Filed: Aug. 11, 2000

(30) Foreign Application Priority Data

Dec. 31, 1999 (DE) .......................................... 199 63 949
Aug. 13, 2000 (DE) .......................................... 199 38 510

(51) Int. Cl.[7] .......................... C25D 17/00; C25D 17/12
(52) U.S. Cl. ................. 204/227; 204/228.3; 204/228.4; 204/288; 204/289; 422/186
(58) Field of Search .......................... 422/186, 186.07, 422/186.13; 210/85, 748; 204/228.1, 228.3, 280, 227, 660, 554, 228.4, 286, 288, 289; 205/742

(56) References Cited

U.S. PATENT DOCUMENTS

| | | | |
|---|---|---|---|
| 1,478,714 A | * 12/1923 | Landreth | ..................... 204/273 |
| 2,490,730 A | 12/1949 | Dubilier | |
| 3,155,603 A | * 11/1964 | Hart | ........................... 204/402 |
| 3,402,116 A | * 9/1968 | Kaltenhauser et al. | ...... 204/402 |
| 4,341,617 A | 7/1982 | King | |
| 5,147,532 A | * 9/1992 | Leek, Jr. | ....................... 210/97 |
| 5,660,719 A | * 8/1997 | Kurtz et al. | .................. 210/85 |
| 6,338,789 B1 | * 1/2002 | Hecking | ...................... 205/742 |

FOREIGN PATENT DOCUMENTS

| | | |
|---|---|---|
| DE | 195 41 234 A1 | 6/1997 |
| EP | 1 002 765 A2 | 5/2000 |

* cited by examiner

Primary Examiner—James J. Seidleck
Assistant Examiner—Thao Tran
(74) Attorney, Agent, or Firm—Mallinckrodt & Mallinckrodt; Robert R. Mallinckrodt

(57) ABSTRACT

The invention relates to an apparatus for treating water by means of an electric field. An Anode and a cathode are arranged in a treatment chamber. The cathode has a plurality of parallel pins. Seed crystals are deposited on these pins. There are means for separating these seed crystals from the pins. The apparatus is to be of simple design and is to have high efficiency with regard to the formation of seed crystals. The cathode is to be kept free from lime depositions. To this end, the seed crystals are separated or stripped from the pins by means of a perforated disc. The pins extend through the holes of this perforated disc. The perforated disc is guided over the pins. The perforated disc can be moved by water pressure or by an electric motor. The electric motor has as second function the actuation of a safety valve controlled by a monitoring device.

18 Claims, 18 Drawing Sheets

C-C

D-D

D-D

APPARATUS FOR TREATING WATER BY MEANS OF AN ELECTRIC FIELD

BACKGROUND OF THE INVENTION

The invention relates to an apparatus for treating water by means of an electric field. The apparatus has a treatment chamber. An anode and a cathode is arranged in this treatment chamber. When a preferably inhomogeneous electric field is applied between the anode and the cathode, seed crystals of minerals contained in the water are formed on the cathode. These seed crystals are separated from the cathode by stripping means and carried away with the flowing water.

Drinking water contains essential minerals, among others calcium and magnesium carbonates. Such minerals, in total, are called water hardness. On one hand, such minerals are important under health aspects. On the other hand, they may cause malfunction of the drinking water installation, in particular if the water is heated. When the water is heated in a drinking water heater, for example, insoluble lime depositions, also called boiler scale, are formed. This boiler scale is formed on the warm side of the installation. Boiler scale impedes heat transmission. In tubes, the boiler scale, over the years, may result in closure of the tube installation downstream of the drinking water heater.

In order to avoid such depositions of boiler scale, the drinking water has been "softened". This softening process removes the minerals from the drinking water. Such softening can be achieved by ion exchange or reverse osmosis. This avoids the formation of boiler scale. In exchange therefor, however, the quality of the drinking water is reduced by the removal of the minerals, which, for other reasons, are desirable.

Methods of treating drinking water by means of a so-called "electro-physical" apparatus is known. Such electro-physical apparatus causes the formation of seed crystals in the drinking water. The seed crystals are carried away by the drinking water. The conglomeration of the seed crystals results in the drinking water thus treated causing less deposition in the form of boiler scale, on one hand. On the other hand the minerals in the drinking water are retained.

The treatment by means of electro-physical apparatus is substantially based on the following principle:

Drinking water always contains a certain proportion of carbon dioxide ($CO_2$) dissolved therein. This carbon dioxide forms a reaction equilibrium with the remaining components, calcium hydrogen carbonate ($Ca(HCO_3)_2$ being formed from $CaCO_3$ in accordance with the reaction equation

$$CaCO_3 + H_2O + CO_2 \leftrightarrows Ca(HCO_3)_2$$

If the water is heated, $CO_2$ will escape from the water and boiler scale will be formed. It is, however, also possible to change purposefully the lime-carbon dioxide equilibrium in the drinking water.

If carbon dioxide is supplied to the water, this will result in shifting the equilibrium to the left in the above equation. Seed crystals of calcium carbonate (lime over-saturation) are formed from the calcium hydrogen carbonate present in the water. Then the subsequently formed calcium carbonate will be deposited predominantly on the once generated seed crystals, i.e. the seed crystals "grow".

This reaction is caused electrolytically in a treatment chamber containing a cathode and an anode. The seed crystals are formed on the cathode. The seed crystals have to be added to the drinking water after they have grown sufficiently. Then carbonate is already present in the form of seed crystals in the drinking water, when the drinking water is heated. There is no need of generating seed crystals anew. Accordingly, the carbonate will be deposited predominantly on the seed crystals carried away in the water rather than on the installation elements.

It has been found that development of seed crystals is improved if the electric field between the cathode and the anode is inhomogeneous.

EP patent application 0,751,096 discloses an apparatus for the electro-physical drinking water treatment by means of an electric field wherein an electric field inhomogeneous in space is generated by an a.c. voltage superimposed to a d.c. voltage.

A further prior art apparatus comprises a special steel brush serving as the cathode on which seed crystals are formed. These seed crystals are separated from the cathode by means of a stripper. This stripper is a comb which is passed through the special steel brush an and causes deformation of the flexible "bristles".

DISCLOSURE OF THE INVENTION

It is an object of the invention, to provide an improved apparatus for the electro-physical treatment of drinking water.

It is a further object of the invention, to provide an apparatus for the electro-physical treatment of drinking water which is of simple and inexpensive design.

It is a still further object of the invention to provide an apparatus for the electro-physical treatment of drinking water which has high efficiency with regard to the formation of seed crystals.

It is another object of the invention to provide an apparatus for the electro-physical treatment of drinking water wherein the cathode is kept permanently free from lime depositions.

In order to achieve these and other objects, an apparatus for treating water by means of an electric field has a treatment chamber. An anode and a cathode is arranged in this treatment chamber. The cathode has a plurality of parallel elongated elements. Removing means are provided for removing, from these elongated elements of the cathode, seed crystals formed thereon of minerals contained in the water. These removing means comprise a perforated disc, the elongated members of the cathode extending through the holes of the perforated disc. Such perforated disc permits safe removal or separation of the seed crystals from the elongated elements.

The elongated elements may be rigid pins.

Narrow fit between the pins and the holes of the perforated disc for stripping the seed crystals may result in friction, whereby a rather large force is required to axially displace the perforated disc. In order to avoid this friction, the pins of the cathode may extend in the flow direction of the water, the holes of the perforated disc having a larger diameter than the pins and defining flow passage restricting means for increasing the flow velocity of the water at the surface of the pins. To this end, the holes in the perforated disc through which the pins of the cathode extend may be nozzle-shaped, the smaller diameter of the nozzle being downstream.

The perforated disc is movable in the flow direction over the lengths of the pins. As long as the pins of the cathode extend through the perforated disc, there is a reduced flow passage, which causes increased flow velocity. Thereby, seed crystals adhering to the cathode are flushed away and are added to the drinking water. Thanks to the nozzle-shaped or conical holes, continuous reduction of the flow passage and increase of the flow velocity is achieved.

In the absence of water flow, the perforated disc may be held, by means of a spring, in a position in which the pins extend through the holes of the perforated disc with their full lengths. When water flows, the perforated disc is displaced by the water pressure against the force of the spring and is shifted over the pins of the cathode. Then the seed crystals are removed each time, when water flow is initiated by tapping of water, for example.

In order to avoid restriction of the normal water flow through the perforated disc and the pins, the perforated disc may be displaced by the water pressure beyond the lengths of the pins. In this way, heavy restriction of the water flow takes place only during an initial phase of the tapping procedure.

In another embodiment of the invention, the seed crystals are removed by stripping means, which are movable over the surface and driven by an electric drive motor, and are taken along by the water flow. A shut-off valve governing the water flow is provided in a fitting part of the apparatus. Furthermore, monitoring means are provided for monitoring, in accordance with given safety criteria, the water quantity flowing through the apparatus, in order to avoid damages caused, for example, by leaking water. The shut-off valve and the drive motor are also under the control of the monitoring means to close the shut-off valve, when the monitoring means respond.

In this embodiment, motor-driven stripping means are guided over the cathode. The stripping means need not be moved by the water pressure. Thereby, there is no restriction of the water flow. Larger forces can be exerted by the drive motor. The servo or drive motor required therefor is, simultaneously, used for the closing of the shut-off valve in the water pipe, if, for example, unusually high water flow is detected in the case of a burst in a water pipe, or, for example, water is flowing over an unusually long time indicating inadvertent leaving open of a water tap. Therefore, different functions can be fulfilled with one apparatus and one servo or drive motor used for different purposes.

The perforated disc may be moved against the action of a return spring through a transmission comprising a cam driven by the servo or drive motor and a push rod.

Using a servo or drive motor for moving the perforated disc permits passing the water flow between the pins and transverse to the pins.

Embodiments of the inventions will be described hereinbelow with reference to the accompanying drawings.

DESCRIPTION OF PREFERRED EMBODIMENTS

Figure 1:
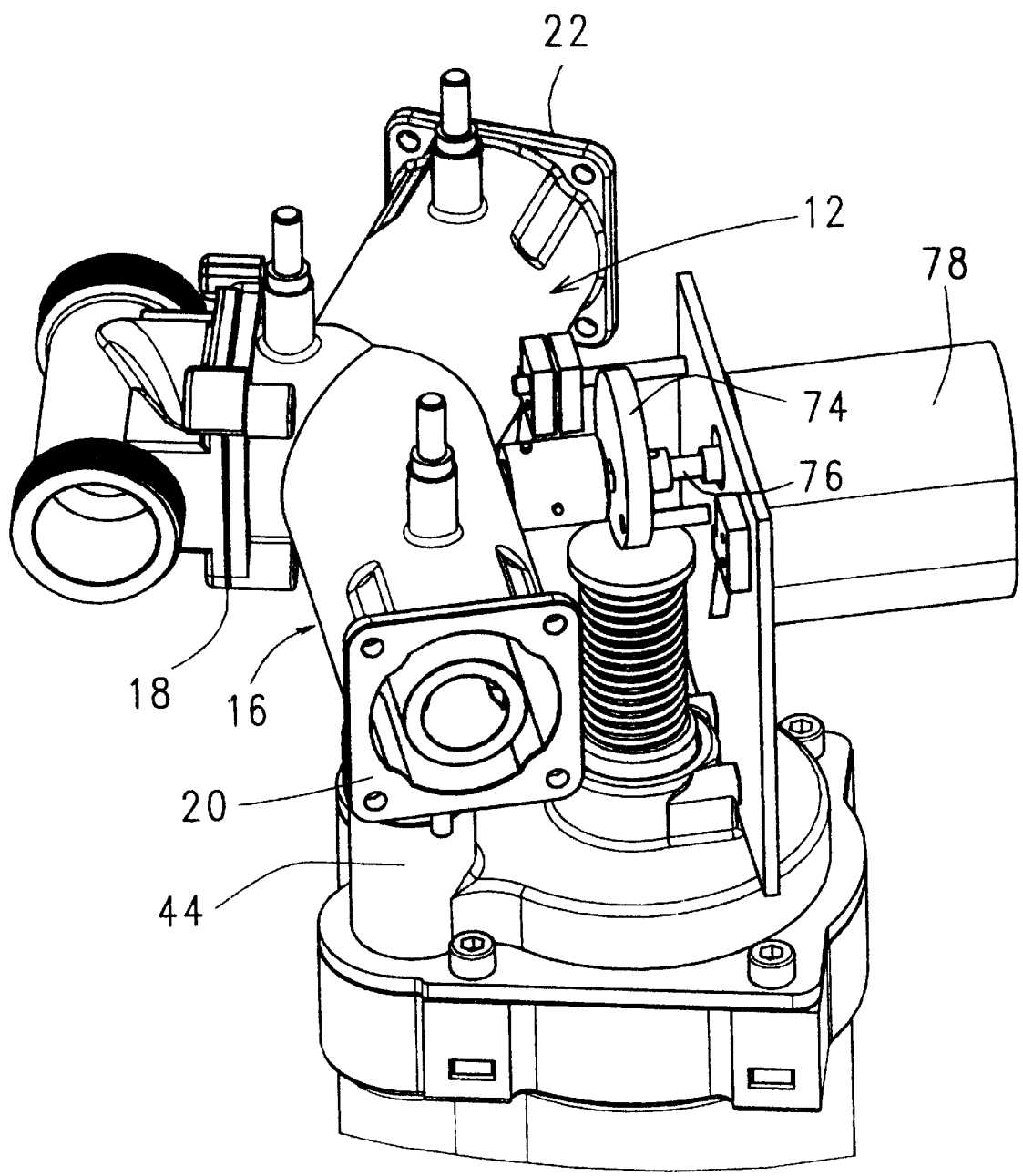
FIG. 1 shows a longitudinal section of a module with a treatment chamber with anode and cathode

In FIG. 1 numeral 10 designates a module for the treatment of drinking water. The water flows in the direction of the arrows 12 through an inlet 14 into the treatment chamber 16. The water flows in the direction of the arrows 20 through an outlet 18 out of the treatment chamber 16.

Figure 5:
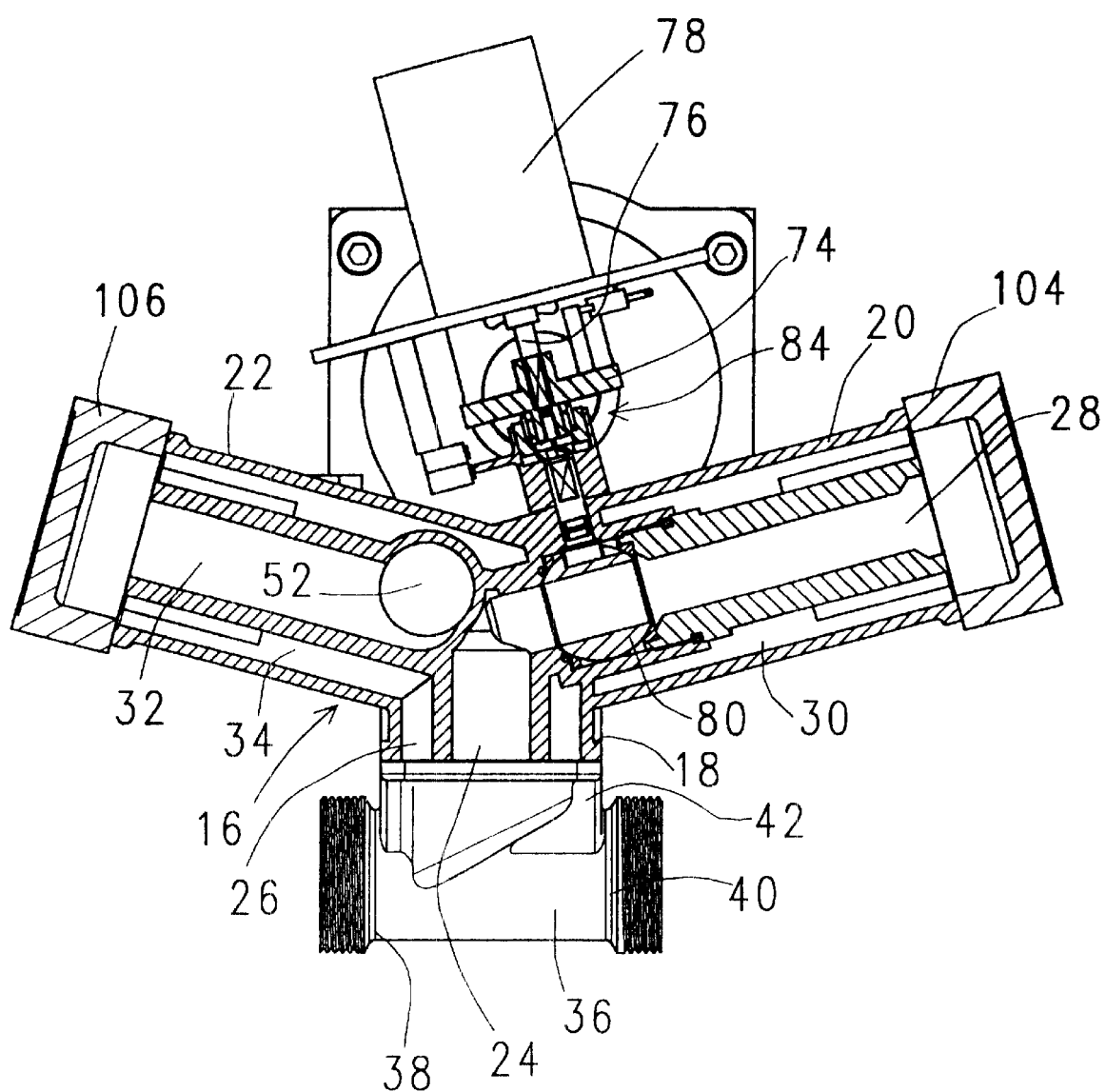
FIG. 5 is a side view of a cathode only
Figure 6:
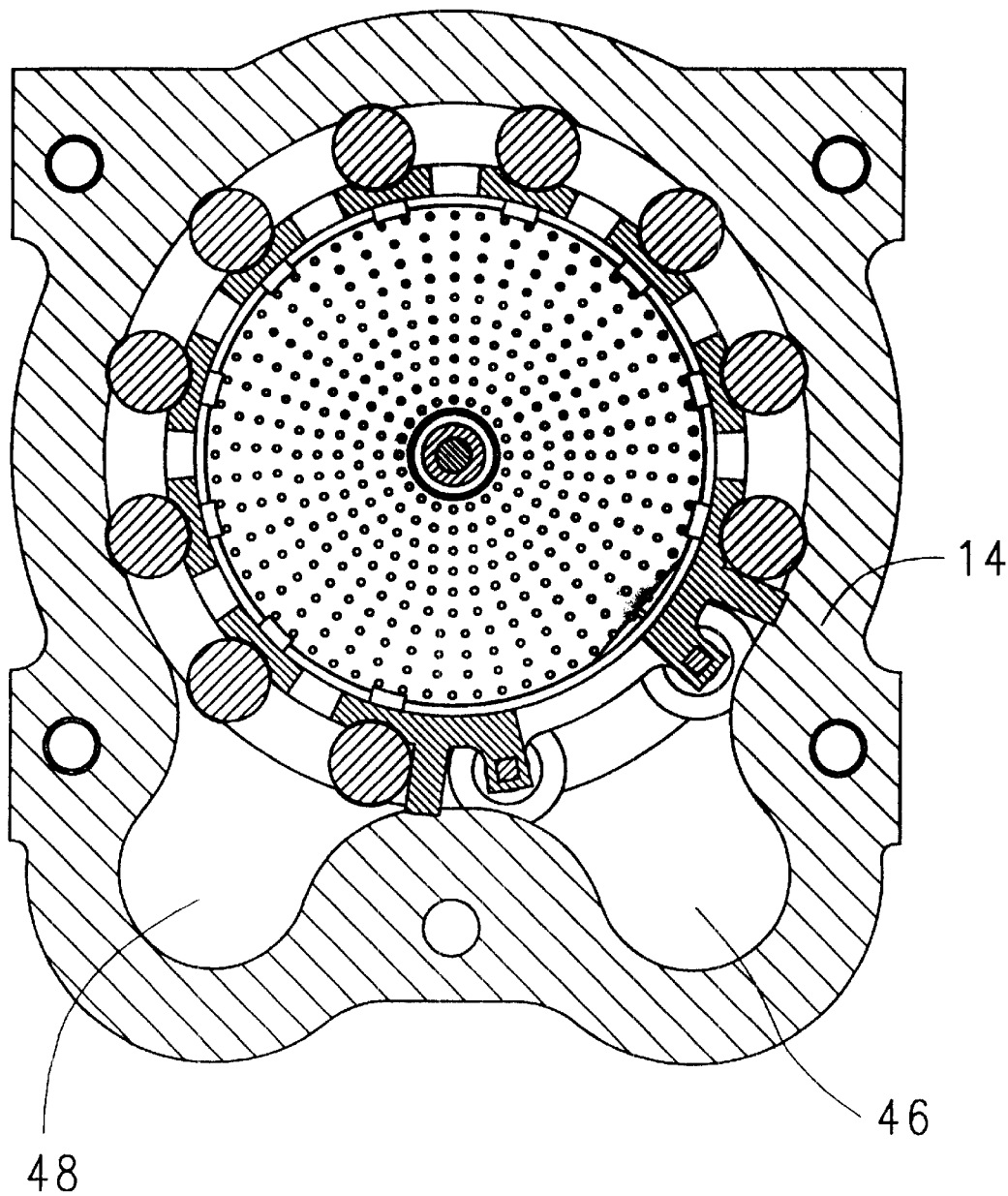
FIG. 6 shows a view of the cathode as seen from the bottom in FIG. 5

A cathode 22 and anode 24 are arranged in the treatment chamber 16. The anode 24 is supported in an anode carrier 26. The anode carrier 26 preferably consists of plastics. The cathode 22 is supported in a cathode carrier 28, which is a guide sleeve. The cathode 22 consists of a base plate 30 with a plurality of openings 32 and pins 34. This is shown in FIG. 5 and FIG. 6. The pins 34 are arranged normal to the base plate 30 and preferably have identical lengths. The base plate 30 extends nearly completely over the whole cross section of the treatment chamber and fits to the form of the treatment chamber. Connectors 36 and 38 are connected to a voltage source (not shown). Connector 36 is connected to a negative and connector 38 is connected to a positive terminal of the voltage source. The connectors 36 and 38 are connected to the cathode 22 and anode 24, respectively.

Figure 2:
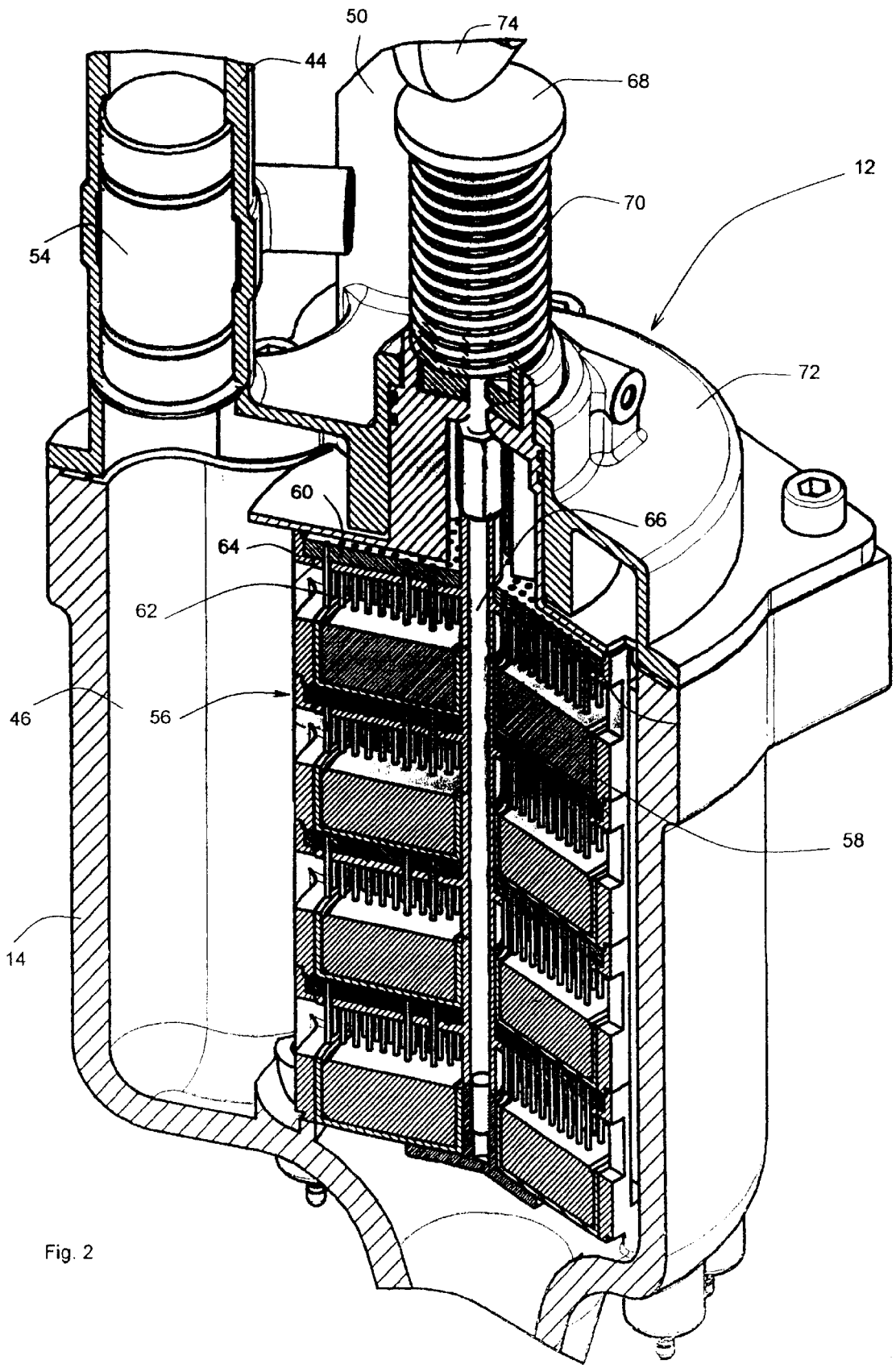
FIG. 2 shows a detail "X" of FIG. 1 at an enlarged scale

In FIG. 1 numeral 40 designates a perforated disc. The perforated disc 40 is integral with a sliding sleeve made of plastics. The sliding sleeve has guiding edges 42. The perforated disc has holes 44 through which the pins 34 extend, as shown in FIG. 2. The holes 44 are conical, the downstream end 46 having a smaller diameter than the upstream end. The holes 44 have a larger diameter than the pins 34 over their entire length such that a gap is formed between the pins 34 and the respective openings 44 in the perforated disc to permit water flow therethrough.

The perforated disc is urged by a restoring spring 48, in a direction opposite the flow direction, against the base plate 30 of the cathode 22. A guiding pin 50 is mounted on the cathode 22 and extends beyond the lengths of the pins 34 of cathode. This ensures that the plate 40 is not tilted or turned when the plate 40 is shifted and that the plate 40 always fits on the pins of the cathode 34.

Figure 3:
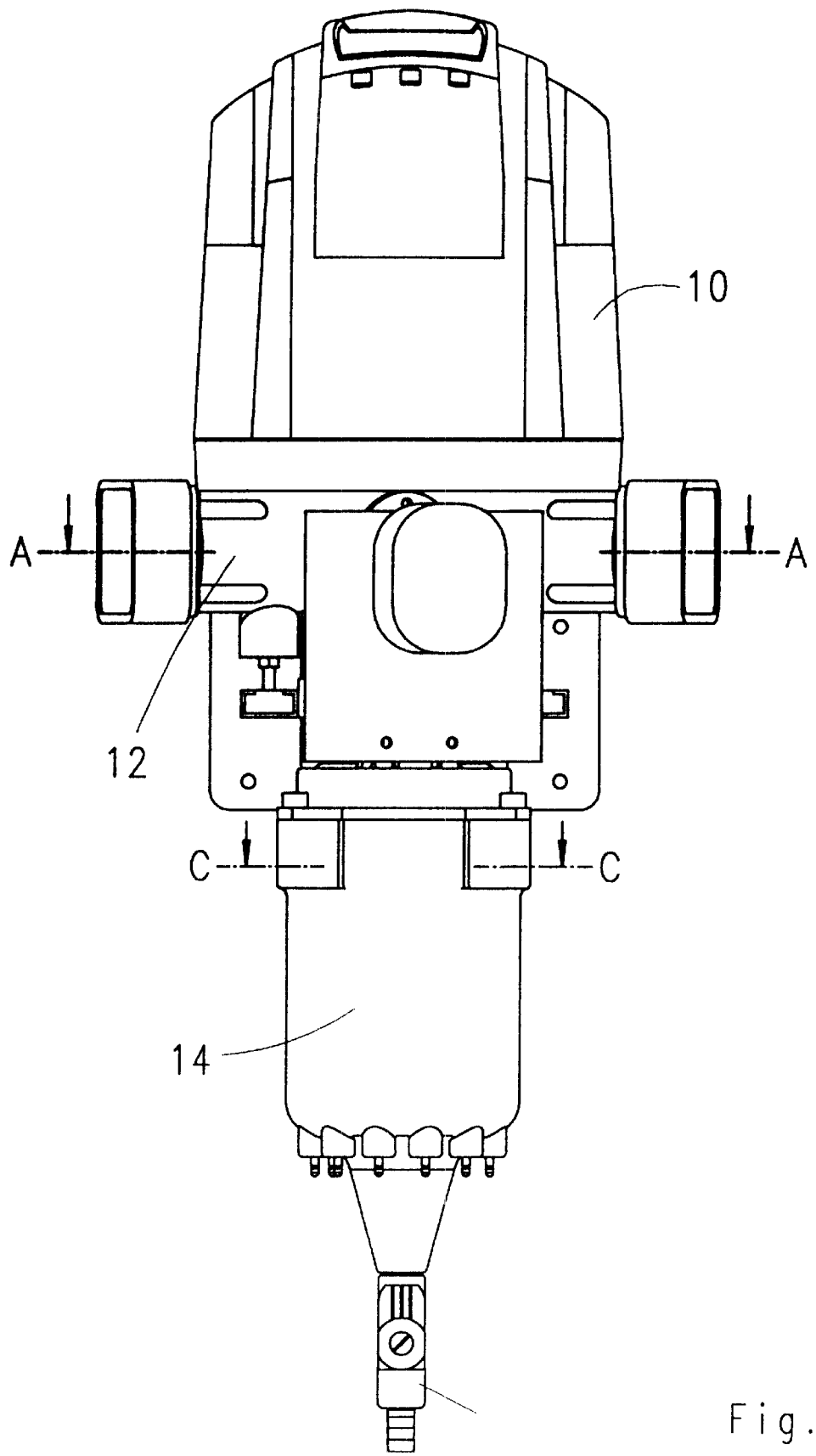
FIG. 3 is a view in the direction "Y" of FIG. 4
Figure 4:
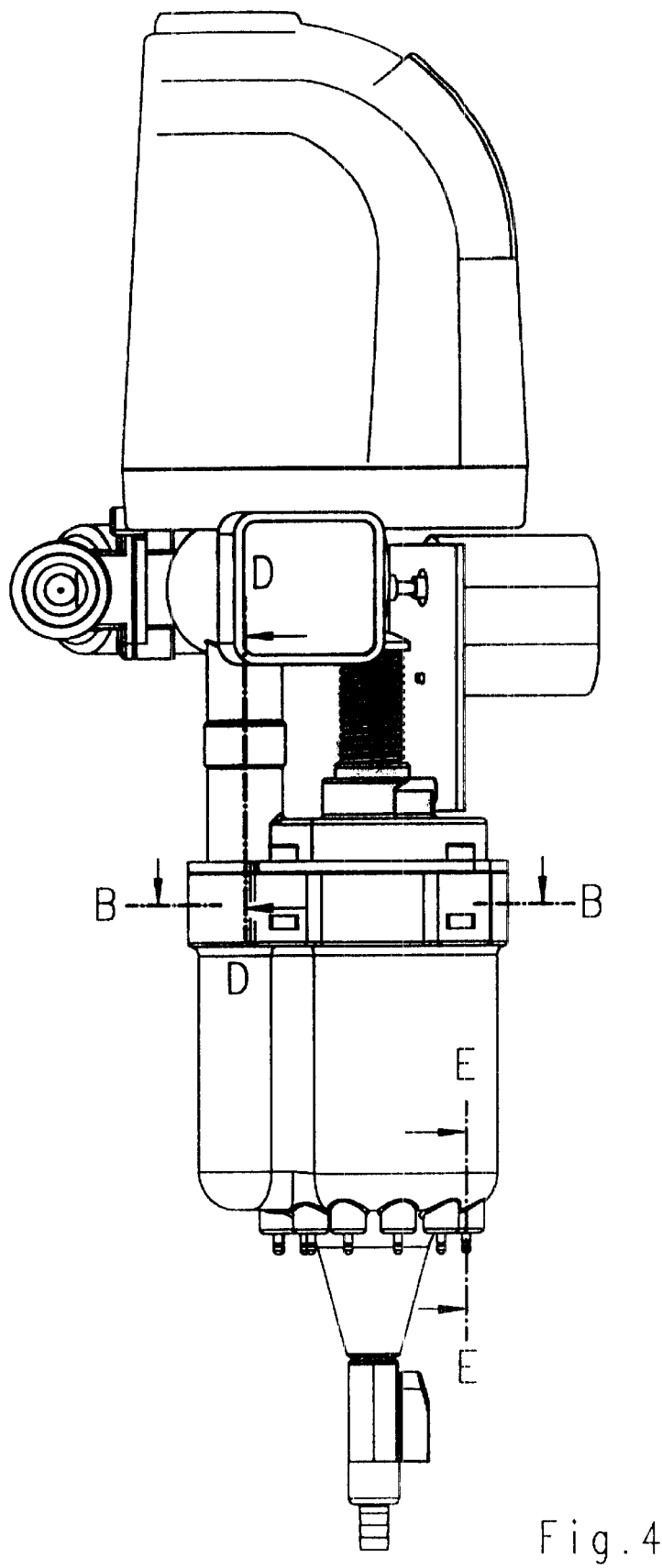
FIG. 4 shows a detail "Z" of the anode of FIG. 1 at an enlarged scale

The anode 24 is a ring-shaped sieve as shown in FIG. 3 and FIG. 4. Tissue plates 54 and 56 of activated carbon are arranged on the front side and backside by means of a clamping ring 52 which, in turn, is latched to the anode carrier 26.

Anode, cathode and spring 48 are made of conducting material while all other components are made of insulating plastics. Numeral 58 in FIG. 1 designates an insulating baffle plate. This insulating baffle plate 58 also serves as a deflecting plate and has concentric openings towards the edge in order to deflect the treated water. This results in a certain insulating effect because the deflected water path represents a limited electrical resistance. Such an insulating effect is necessary especially, if the individual modules are arranged in series.

The described arrangement operates according to the following principle:

A pulsed direct voltage, i.e. a direct voltage with a rectangular waveform or any other suitable voltage is applied to anode 24 and cathode 22 through contacts 36 and 38.

Figure 7:
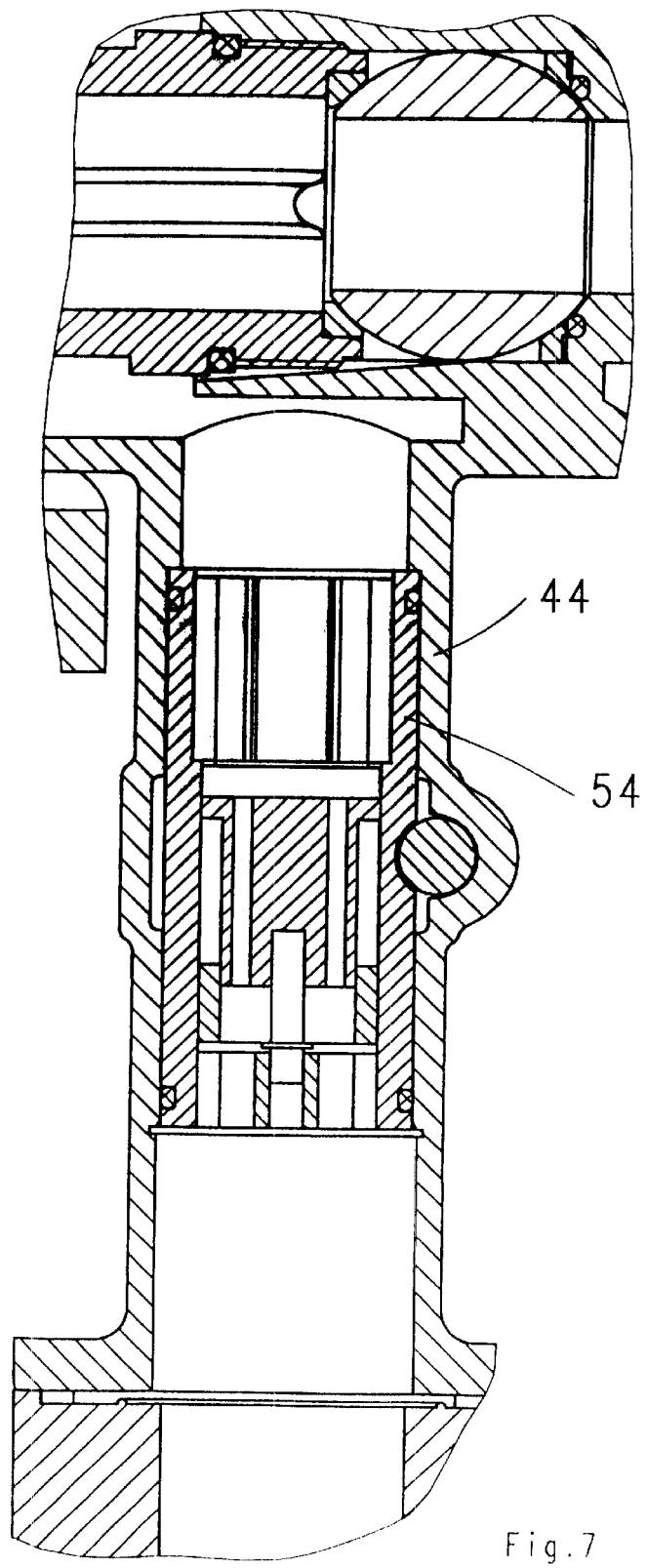
FIG. 7 shows the serial arrangement of two modules of FIG. 1
Figure 8:
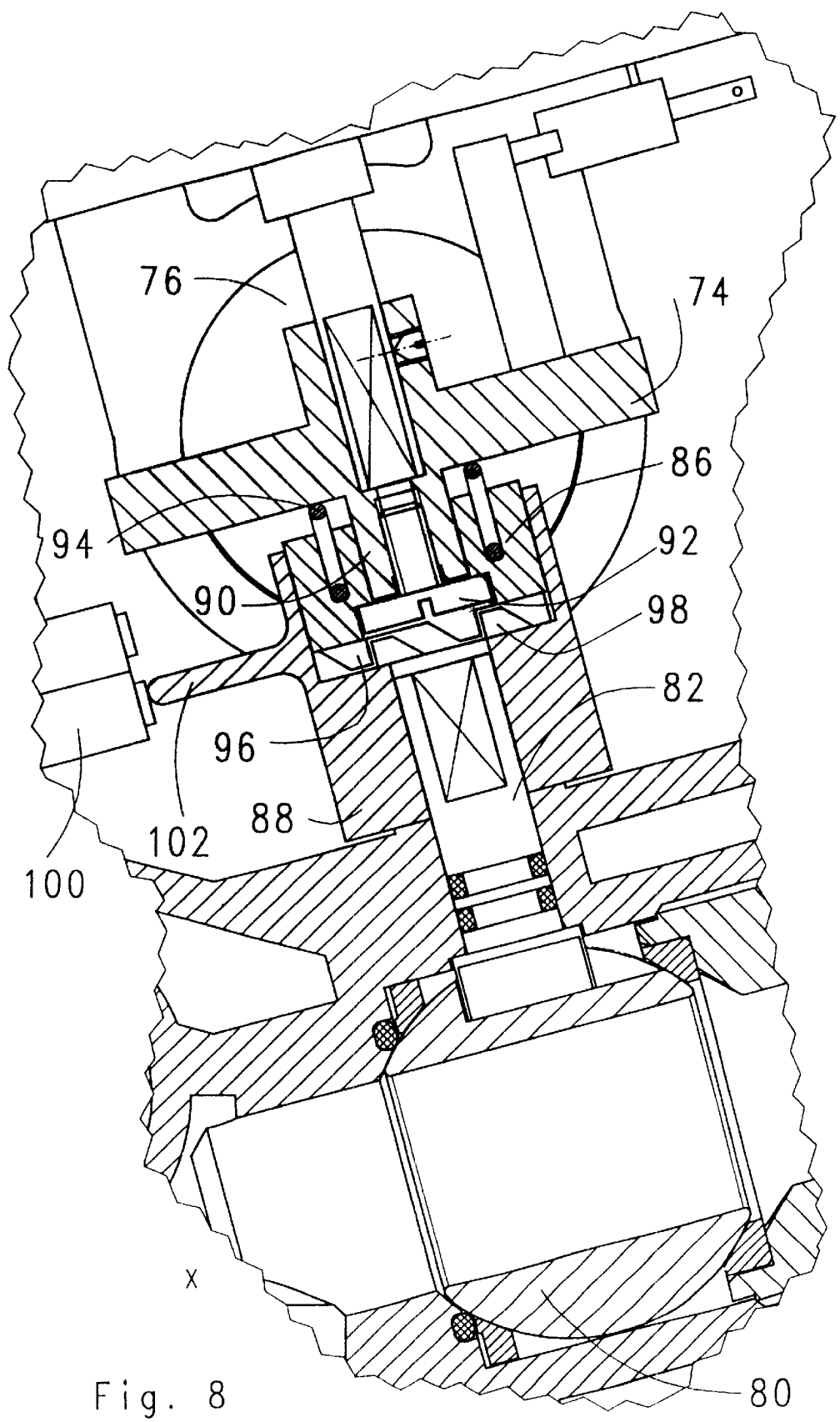
FIG. 8 shows the parallel arrangement of two modules of FIG. 1

The voltage is controlled by means of a conventional flow meter (not shown), i.e. the treatment is only operative, when drinking water is passing. The control is operative to adapt the electrical power to the volume flow of the water. In such way, with parallel or serial mode of operation, it is possible to start with one single module, depending on the flow rate. When the flow rate increases, further modules can be added as shown in FIG. 7 and FIG. 8. Using the flow rate-dependent control, the pulsed direct voltage signal can be adapted with respect to its frequency. Due to the change of the electrical d.c. voltage signal with respect to its frequency, the generation of seed crystals can be promoted. This is the case because of the enhancing influence of the inhomogeneous electrical field.

Figure 9:
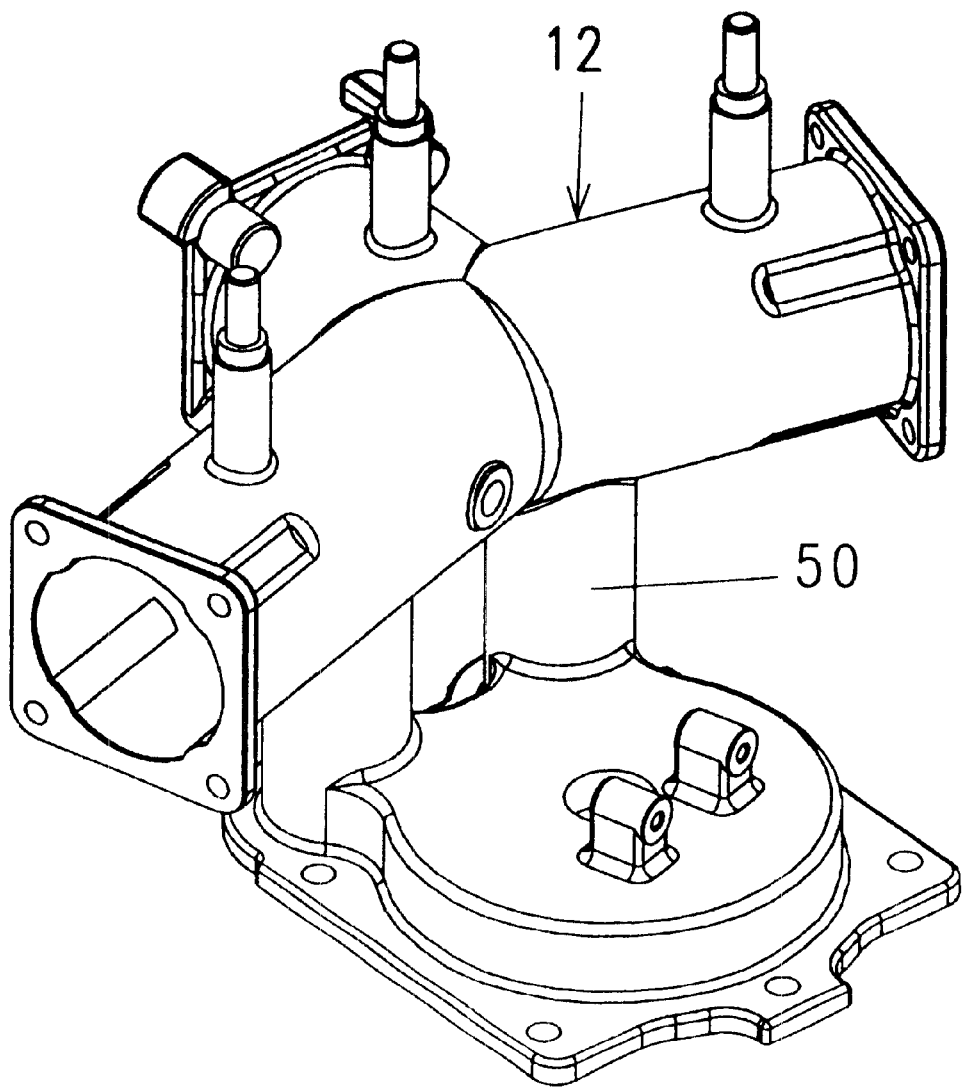
FIG. 9 shows the module of FIG. 1 with flowing water, wherein the free flow passage restricting means are moved into their end position an release the full operating cross section of flow.

In FIG. 1, the treatment chamber 16 is shown in its basic state, when no water is flowing. In FIG. 9 the same chamber is shown with flowing water. The perforated disc 40 is pushed against the spring force of the return spring 48 into the lower end positioned by the water flow. In this position the perforated disc 40 has left the pins of the cathode 34 behind, i.e. the flow restriction by the pins guided in the holes has ceased, and the perforated disc 40 provides maximum flow passage.

In order to safely regain the initial basic position, when no water is flowing (lace-up in the pin area) a guiding pin 50 is mounted on the cathode carrier 28. This guiding pin provides protection from tilting and turning and additionally guides the perforated disc 40 in its full-flow position.

Because of a projection 62, even smallest amounts of water cause the perforated disc to move into its full-flow position. This position remains the same during the complete tapping of water. When a voltage is applied in the flow state, seed crystals are deposited on the individual pins 34 of the cathode 22. When the tapping of water has been finished, the perforated disc 40 is pushed back into its initial position. The seed crystals are washed off by the high flow velocity during the movement of the perforated disc 40 associated with the subsequent tapping of water and are added to the drinking water. In such way, they cannot permanently build-up at the cathode. Due to the "docking" of the carbonates at the seed crystals and the growth of the seed crystals provided thereby and the following washing-off, the pins of the cathode 34 remain free from boiler scale even during long time operation.

The tissue plates 54 and 56 consisting of activated carbon serve to increase the surface of the anode, as activated carbon is a conducting material. The carbonate-carbon dioxide-equilibrium is changed by the activated carbon for the formation of seed crystals, too.

As the temporarily increased flow velocity causes the seed crystals to be washed off the pins, no further stripper, especially no mechanical scraper, is required.

Figure 10:
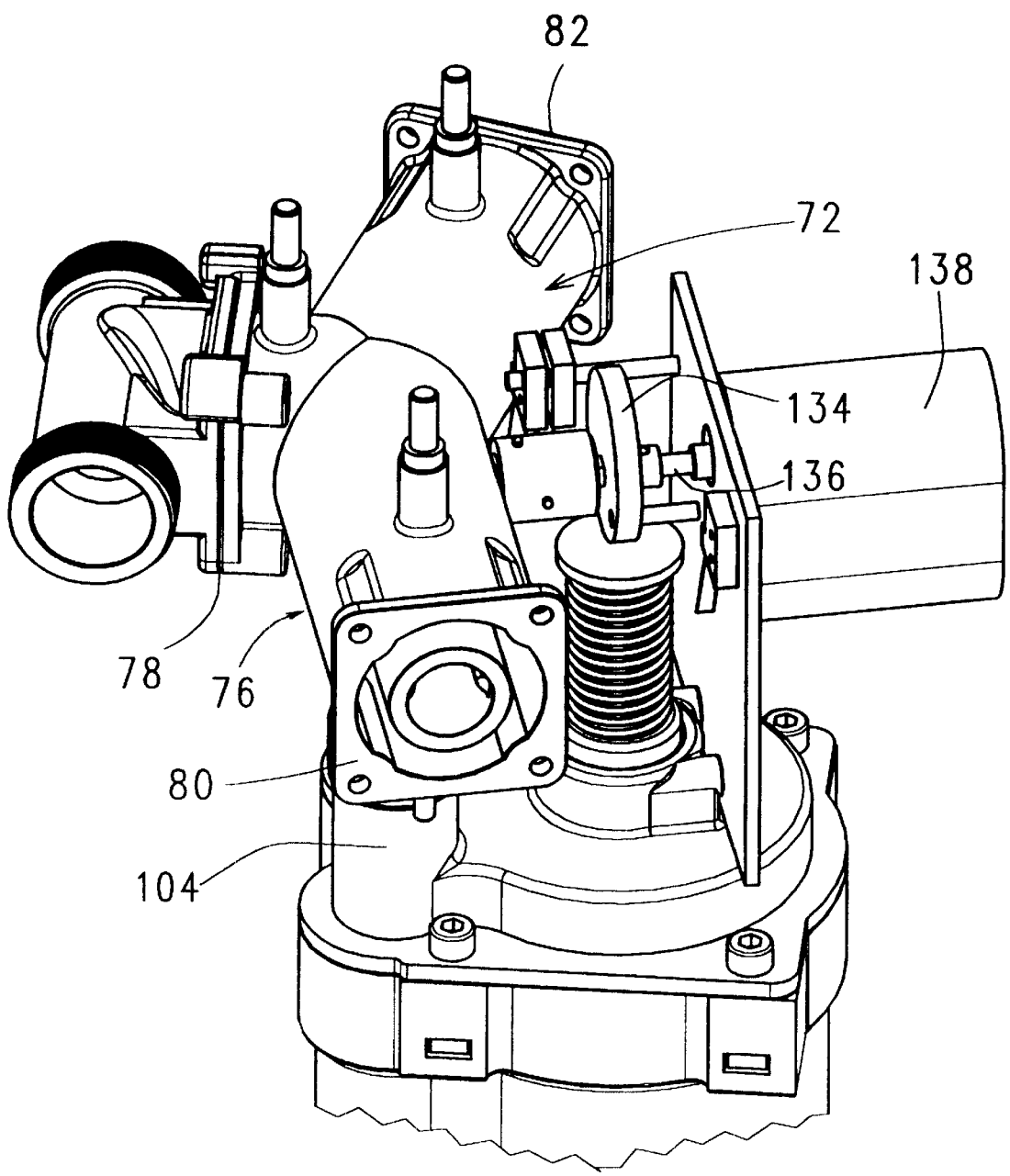
FIG. 10 is a perspective view of the fitting part of a second embodiment of an apparatus for water treatment and monitoring.
Figure 11:
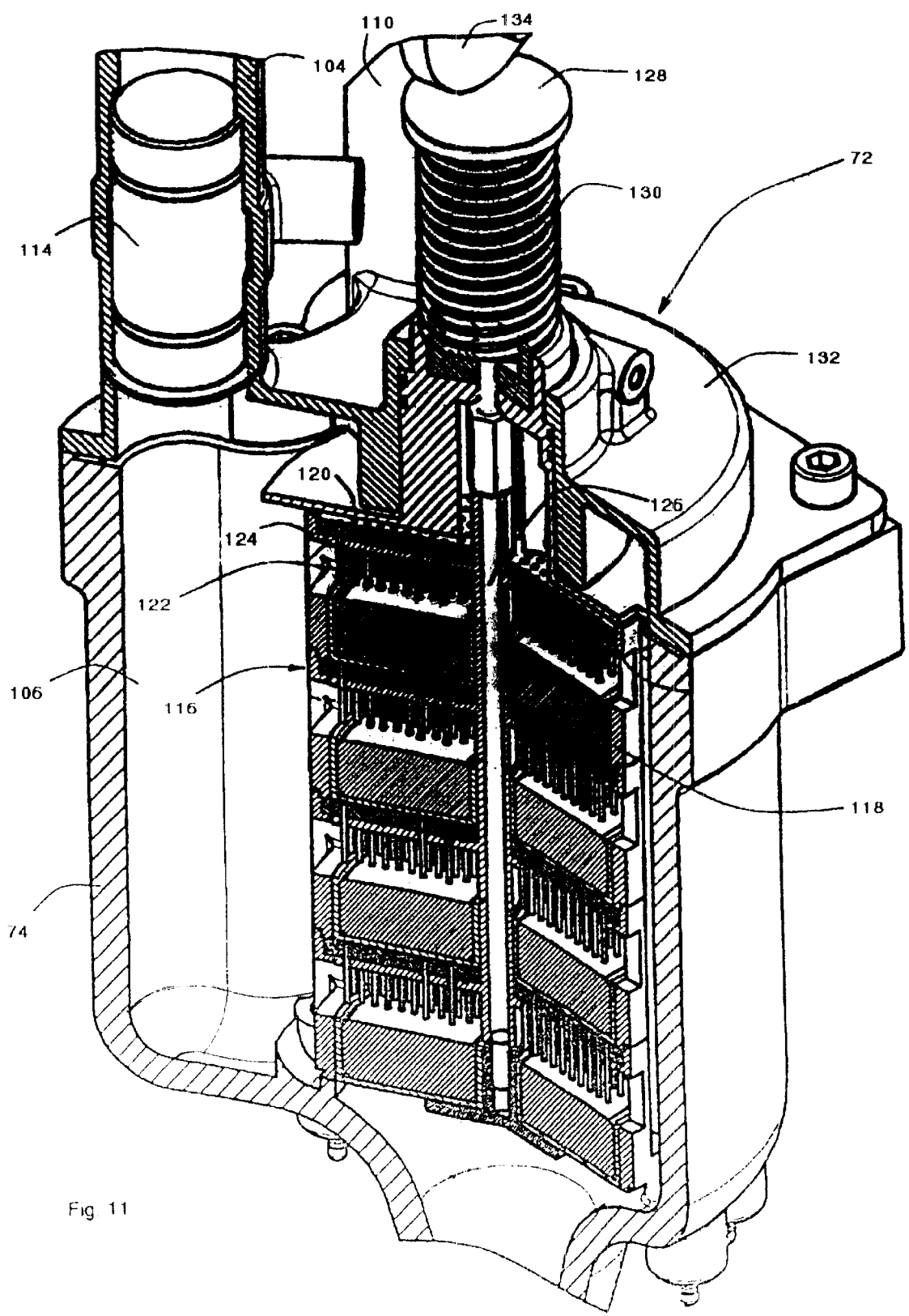
FIG. 11 is a perspective view of the lower portion of the apparatus for water treatment and monitoring, showing the treatment chamber partially in section.
Figure 12:
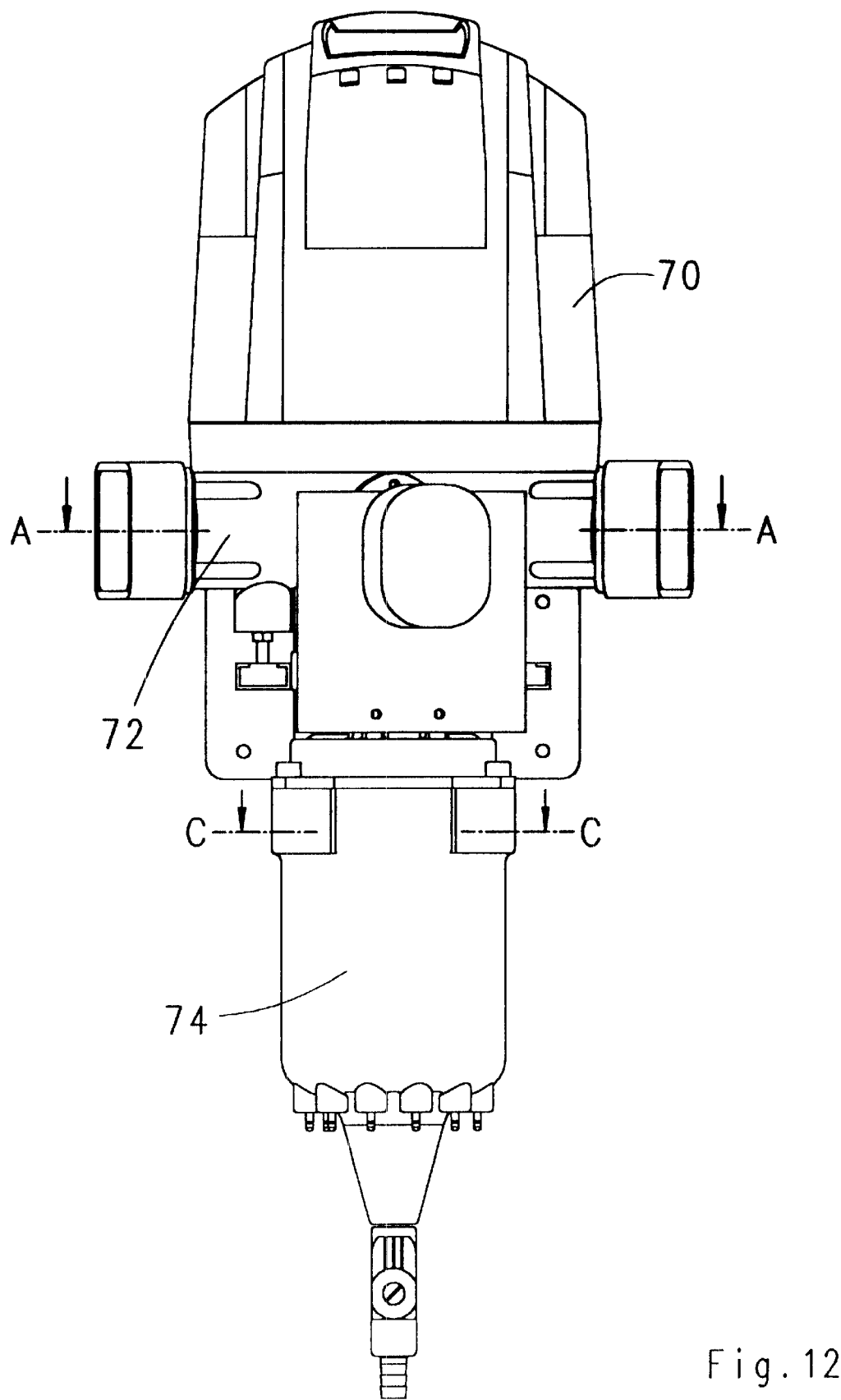
FIG. 12 is a front view of the apparatus for water treatment and monitoring.
Figure 13:
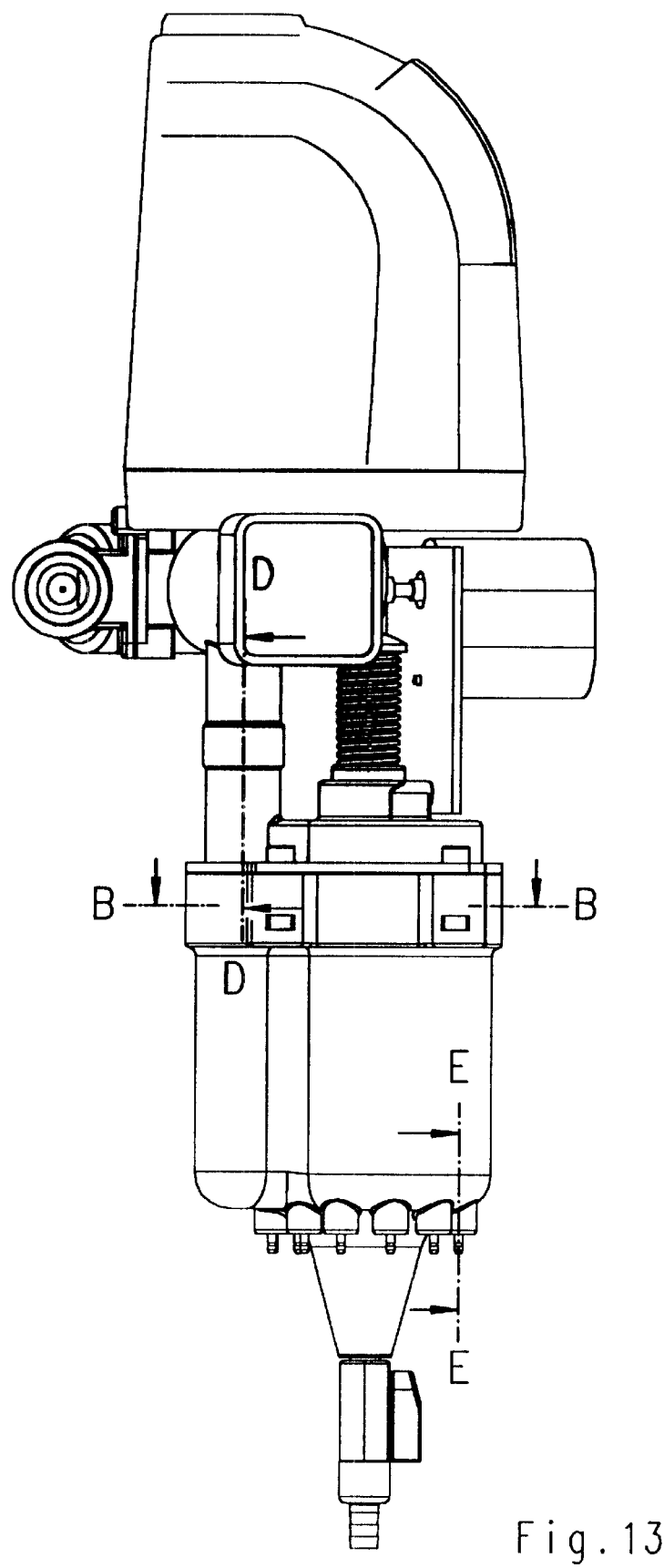
FIG. 13 shows a side elevation of the apparatus for water treatment and monitoring.

FIGS. 10 to 18 show a second embodiment of the invention, wherein the perforated disc is displaced by a servo or drive motor. This servo or drive motor fulfills also a second function, namely the actuation of a shut-off valve. The shut-off valve is controlled by a monitoring device which responds to unusual flow states such as, for example, an unusually high water flow rate (burst of a water pipe) or an unusually long water flow (inadvertently left open water tap). Referring to FIG. 12, numeral 70 designates an electronic monitoring device as "monitoring means" for monitoring the water flow through the apparatus. The monitoring device responds to certain safety criteria and actuates a shut-off valve, in order to avoid damages caused by water. Such a safety criterion may be that the water flow rate exceeds a tolerable maximum value. This would indicate a burst of a water pipe. The safety criterion may, however, also be that a continuously tapped water flow exceeds a tolerable value or that water is tapped continuously longer than a predetermined admissible time. This would indicate a tap being inadvertently left open. Such monitoring devices are known to a person skilled in the art and, therefore, are not described here in detail. The monitoring device 70 is mounted on a fitting part 72 of the apparatus. A treatment chamber 74 is located below the fitting part 72. A "dynamic treatment" of the water flowing through by means of electric fields is effected in the treatment chamber. Because of this treatment, seed crystals are formed, which are carried along with the water. The lime dissolved in the water crystallizes on these seed crystals, whereby it is carried away in the water in the form of small lime crystals and is not deposited on the walls causing calcification.

In FIG. 10, the fitting part 72 is illustrated in perspective view. The fitting part 72 has a Y-shaped conduit body 76. The conduit body 76 has three connecting sockets 78, 80 and 82. The first connecting socket 78 of the conduit body 76 defines two coaxial conduits, (FIG. 14), an inner conduit 84 and an outer conduit 86 surrounding this conduit as an annulus. The second connecting socket 80 also defines two coaxial conduits, an inner conduit 88 and an outer conduit 90 surrounding this inner conduit 88 as an annulus. The third connecting socket 82 also defines two coaxial conduits, an inner conduit 92 and an outer conduit 94 surrounding this inner conduit 92 as an annulus. The inner conduit 84 of the first connecting socket 78 communicates with the inner conduit 88 of the second connecting socket 80. The outer conduit 86 of the first connecting socket 78 communicates with the outer conduit 94 of the third connecting socket 82.

Numeral 96 designates a T-fitting, which is installed in a water pipe by means of two aligned connecting sockets 98 and 100. Orthogonal to the axis of the two aligned connecting sockets is a T-fitting connecting socket 102 having two coaxial conduits, an inner conduit and an outer conduit surrounding the inner conduit as an annulus. The inner conduit of the T-fitting connecting socket 102 communicates with the connecting socket 98. The outer conduit of the T-fitting connecting socket 102 communicates with the connecting socket 100. The T-fitting connecting socket 102 is connected to the first connecting socket 78 of the Y-shaped conduit body 76.

Figure 14:
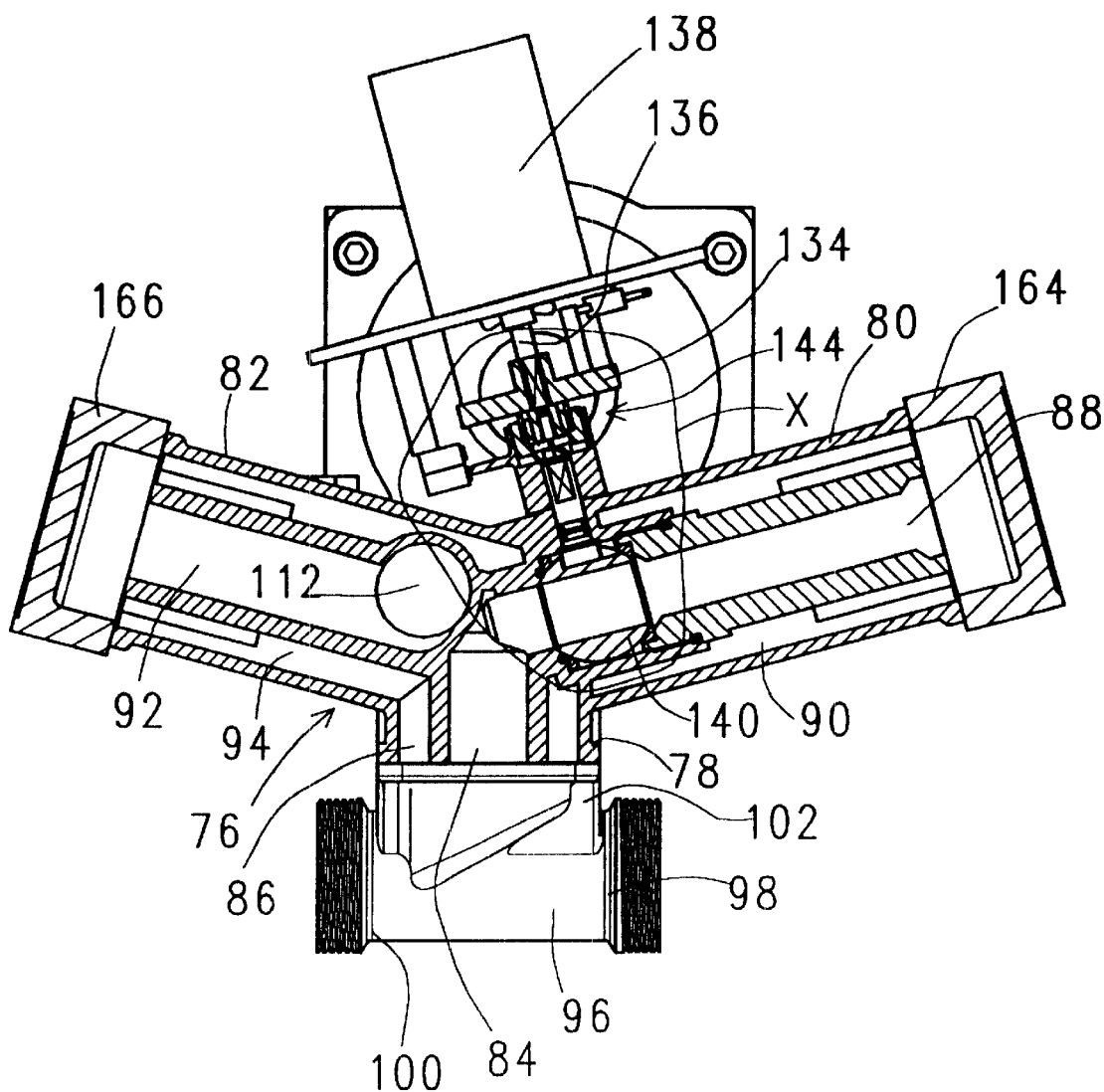
FIG. 14 is a sectional view taken along line A—A of FIG. 12.
Figure 15:
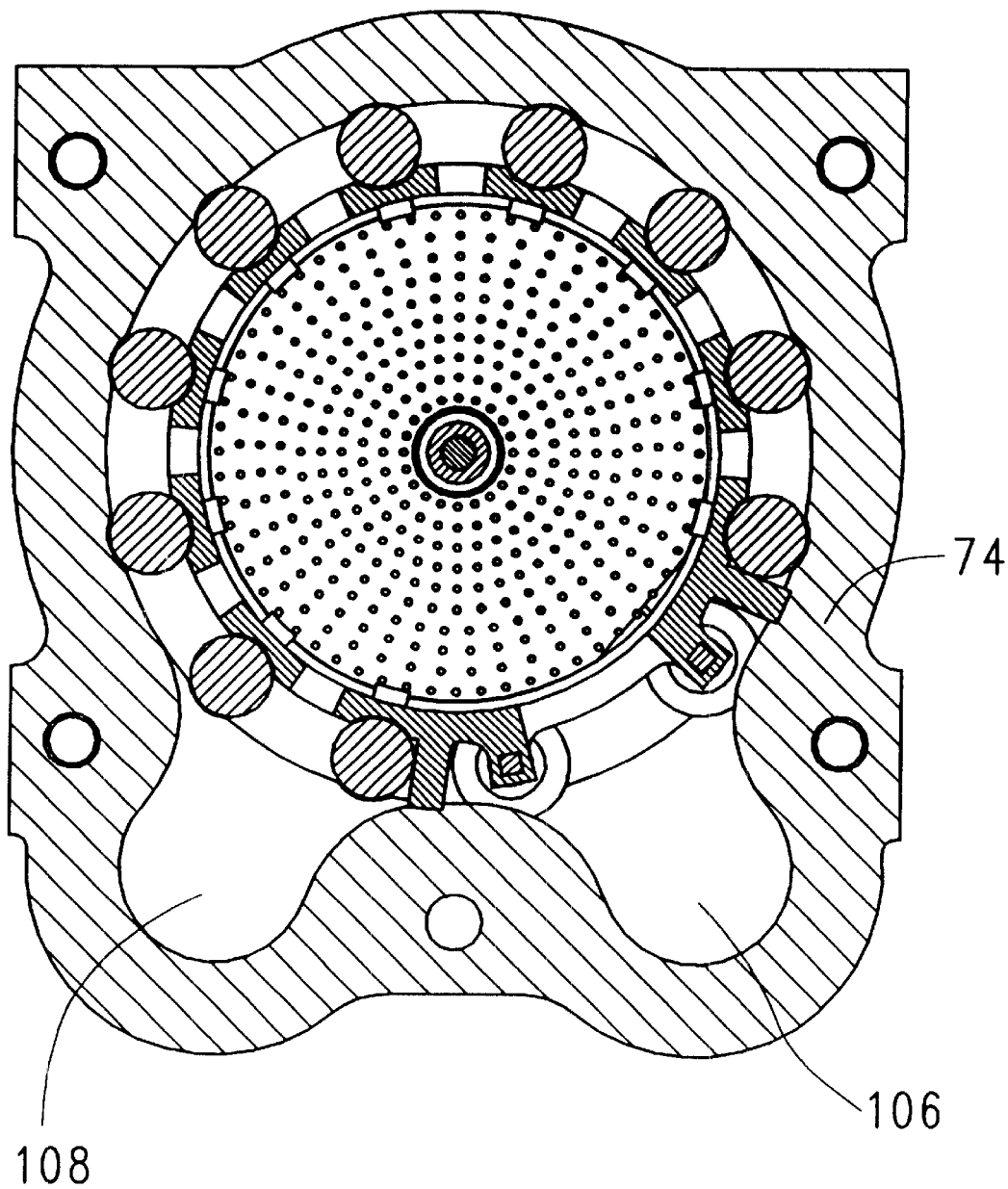
FIG. 15 is a sectional view taken along line C—C of FIG. 12.
Figure 18:
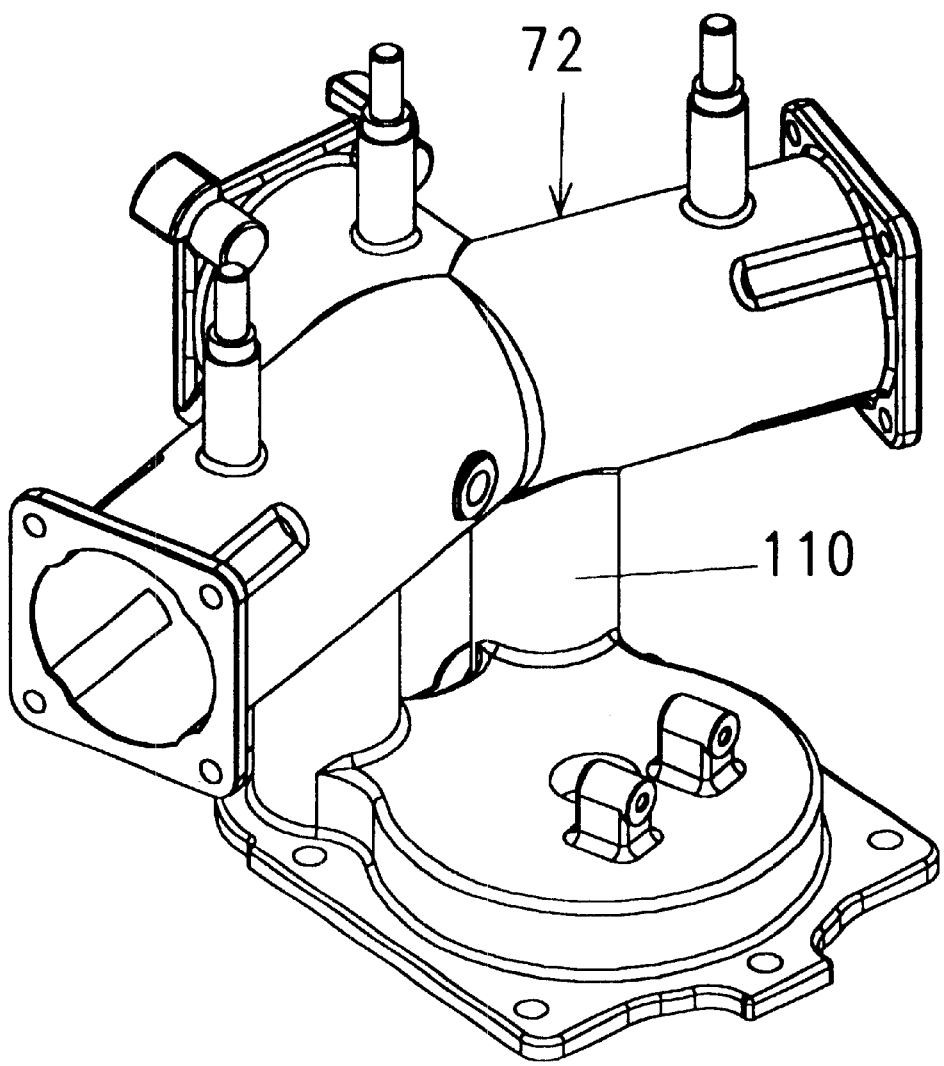
FIG. 18 is another perspective view of the fitting part.

A tubular socket 104 (FIGS. 10 and 11) branches off from the outer conduit 90 of the second connecting socket 80 to the bottom, as viewed in FIG. 10. In FIG. 14, the opening of this tubular socket 104 is hidden by the wall of the inner conduit 88. This tubular socket 104 ends in an inlet 106 of the treatment chamber 74 (FIGS. 11 and 15). An outlet 108 of the treatment chamber 104 is connected with the fitting part 72 through a tubular socket 110 (FIG. 18). The bore 112 (FIG. 14) of the tubular socket 110 (FIG. 18) opens into the inner conduit 92 of the third connecting socket 82 of the conduit body 76, as can be seen in FIG. 14.

Figure 16:
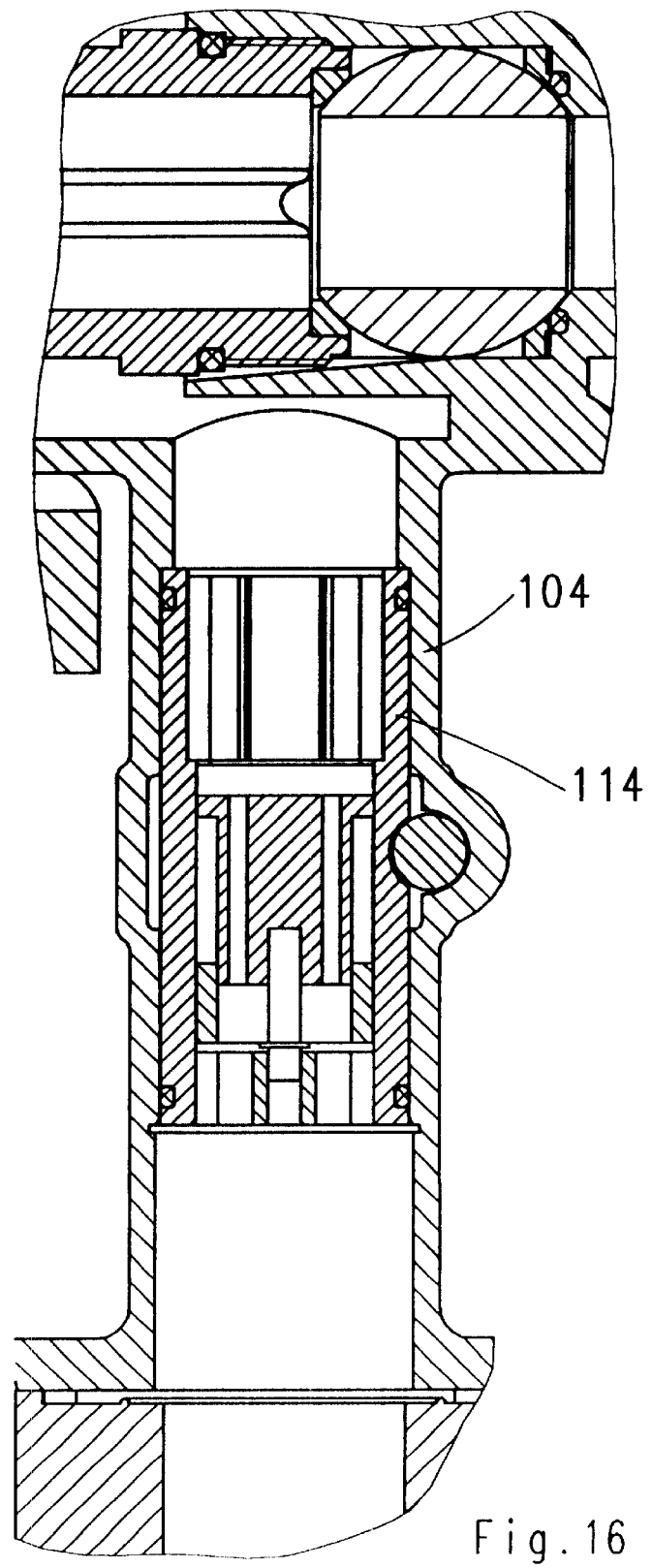
FIG. 16 is a sectional view taken along line D—D of FIG. 13.
Figure 17:
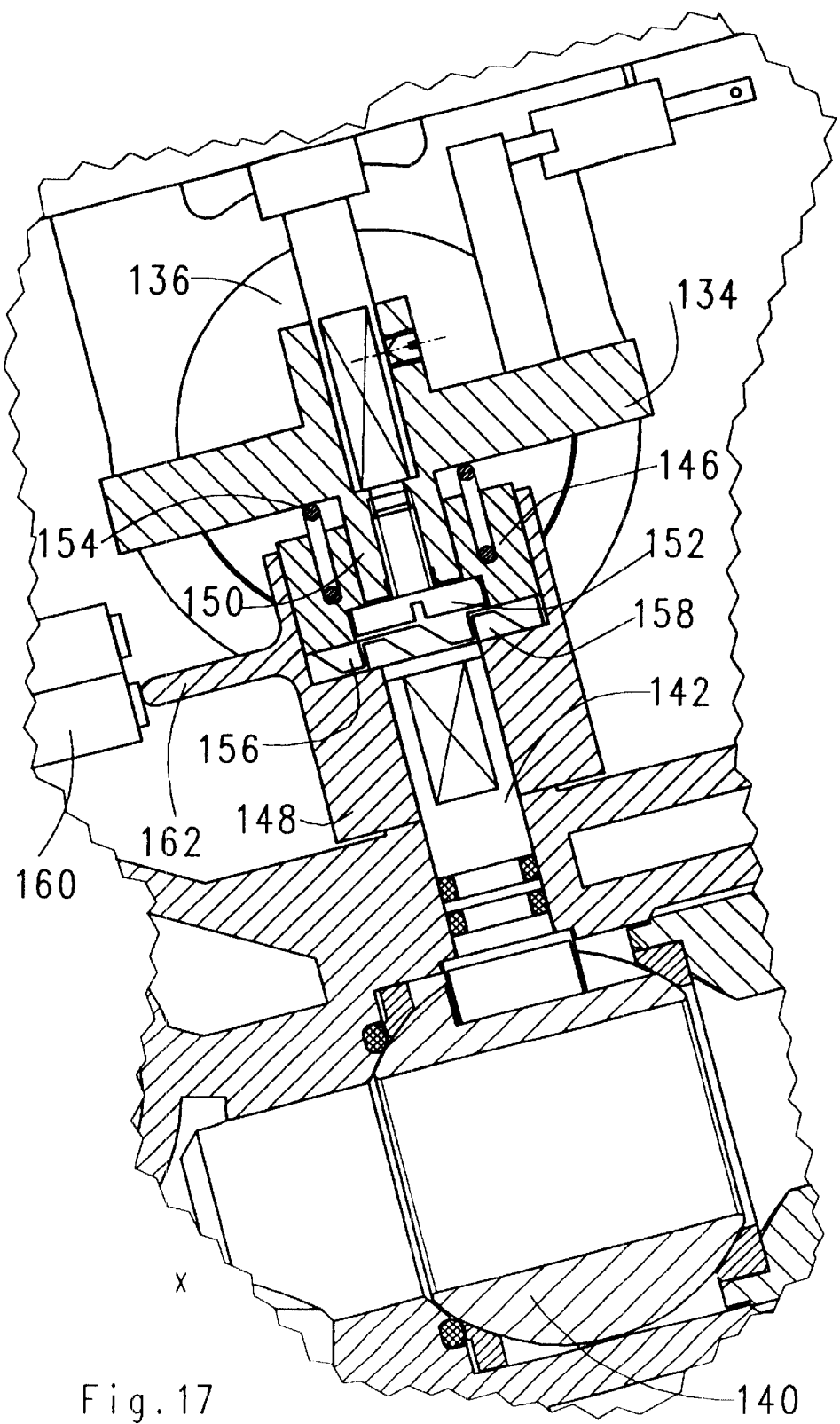
FIG. 17 shows a detail "X" of FIG. 14.

As can be seen from FIGS. 11 and 16, an electronic flow meter 114 is located in the tubular socket 104. Such electronic flow meters are known to persons skilled in the art. Therefore, flow meter 114 is not described here in detail. The flow meter 114, on one hand, supplies a signal indicative of water flow to the monitoring device 70. On the other hand, the signal is applied to a switching device (not shown) which connects the electrodes in the treatment chamber 74 to supply voltage only if the flow meter indicates a water flow rate above a predetermined threshold-which may also be zero.

A plurality of dynamic water treatment units 116 are mounted in the treatment chamber coaxially one above the other. Each water treatment unit 116 consists of an anode 118 and a cathode 120. The cathode 120 consists of an annular disc with a plurality of parallel, axially extending pins 122. The pins extend through correspondingly arranged holes of a perforated disc 124. The perforated discs 124 of all water treatment units are interconnected and connected with a push rod 126. The push rod ends in a disc 128. The disc 128 is engaged by a compression spring 130 in the form of a helical spring. The compression spring 130 abuts a base plate 132 of the fitting part 72. This base plate is the cover of the treatment chamber 74. The push rod 126 can be moved to the bottom, as viewed in FIG. 11, by a cam 134 against the action of the compression spring 130. When this is done, the perforated discs 124 slide on the pins 122 and strip seed crystals therefrom, which have been formed on the pins due to the inhomogeneous electric field acting between cathode 120 and anode 118. These seed crystals are carried along by the water flow. On its path from the inlet 106 to the outlet 108, the water flows substantially transverse to the pins between the pins and between anode and cathode. This results in a relatively long path through the inhomogeneous electric field and, thereby, a relatively long dwell time within this field. Furthermore, the pressure drop between inlet 106 and outlet 108 of the treatment chamber 74 is low.

As can be seen from FIG. 10, the cam 134 is mounted on a shaft 136 of an electric servo or drive motor 138. The push rod 126 (FIG. 11) and the perforated discs 124 are cyclically moved downwards over the pins 122, by the servo or drive motor 138 through the cam 134.

The servo or drive motor 138 has, however, still another function.

As can be seen best from FIG. 14, a shut-off valve 140 in the form of a ball valve is mounted in the inner conduit 88 of the connecting socket 80 of the conduit body 76. In FIG. 14, this shut-off valve 140 is shown in its open position. By rotation of the valve ball through 90° about the axis of the servo or drive motor 138, the shut-off valve 140 can be moved into its closing position. The valve ball of the shut-off valve 140 is rotatable through a ball cock drive 142. The ball cock drive is coupled with the cam 134 and, thereby, with the shaft 136 of the motor 138 through a coupling 144. As can be seen best from FIG. 17, the coupling 144 has a driving-side coupling half 146 and a driven-side coupling half 148. The driving side coupling half 146 is mounted on a polygonal portion of the cam 134 and shiftable between the cam 134 and a stop 152. The driven-side coupling half 146 is engaged by a spring 154 which abuts the cam 134 and urges the coupling half 146 away from the cam 134 into an engagement position. The driven-side coupling half 148 is non-rotatably mounted on the ball cock drive 142. The coupling halves 146 and 148 are in engagement through teeth 156 and 158. With one direction of rotation, the teeth are in engagement through inclined faces. With the other direction of rotation, the teeth are in engagement through radial surfaces parallel to the axis if of rotation. With one direction of rotation of the servo or drive motor 138, the coupling half 146 is disengaged through the action of the spring 154. With this direction of rotation, the servo or drive motor 138 does not transmit rotary motion to the valve ball of the shut-off valve 140. With the opposite direction of rotation, the axis-parallel radial surfaces of the teeth 156 and 158 get into engagement. Thereby, the driven-side coupling half is taken along. The shut-off valve is moved into its closing position. The rotary motion is limited by means of a microswitch 160, which is actuated by a cam 162 on the driven-side coupling half 148.

In the illustrated installation, the second and third connecting sockets 80 and 82, respectively, of the conduit body 76 are closed by caps 164 and 166, respectively (FIG. 14). The caps 164 and 166 permit passage of the water flow from the inner conduits 88 and 92, respectively, to the outer conduits 80 and 44, respectively, of the connecting sockets 80 and 82, respectively.

The described apparatus operates as follows:

Water flows from the water supply pipe through the inner conduit of the T-fitting connecting socket 102 into the inner conduit 84 of the first connecting socket 78 of the conduit body 76. From there, the water gets into the inner conduit 88 of the second connecting socket 80. The water flow is then re-directed by the cap into the outer conduit 90 of the second connecting socket 80. The water flow gets to the inlet 106 of the treatment chamber 74 through the tube socket 104. The water flows through the water treatment units 116 to the outlet 108 of the treatment chamber 74, thereby forming seed crystals. The treated water flow gets through the tube socket 110 (FIG. 18) into the inner conduit 92 of the third connecting socket. By cap 166, the water flow is also here re-directed into the outer conduit 94 of the first connecting socket 82. Then the water flow gets through the outer conduit 86 of the first connecting socket 78 into the outer conduit of the T-fitting connecting socket 102 and to the outlet 100, which, in turn, is installed in the water supply pipe.

With one direction of rotation of the servo or drive motor 138, the perforated discs 124 are moved through the cam 134 back and forth on the pins 162. This is the normal operation.

When the monitoring device 70 responds to an unusual situation, it will reverse the direction of rotation of the servo or drive motor 138. The the servo or drive motor 138 rotates the valve ball of the shut-off valve 140, until the servo or drive motor 138 is switched off through the microswitch 160, after 90° rotation, or is reversed again.

In the described apparatus, not only the servo or drive motor 138 is utilized for different functions of water treatment and monitoring. Also the flow meter 114 fulfills different functions, namely, on one hand, the switching-on and switching-off of the voltage for water treatment and, on the other hand, the monitoring of unusual water flow states. In normal operation, the speed of the servo or drive motor 138 is varied depending on the flow signal from the flow meter 114 such that the speed of the servo or drive motor 138 is increased, when the water flow is increased. Thereby, with increased water flow, also the speed of the stripping means, namely the perforated discs 124, is increased.

After the cap 164 has been removed from the second connecting socket 80 of the conduit body 76, the second connecting socket may be connected to corresponding connecting socket having coaxial conduits of a pressure reducer-filter-combination. In similar way, further apparatus for water treatment such as activated carbon filters may be connected to the third connecting socket 82, after the cap 166 has been removed. The apparatus connected this way to the connecting sockets 80 and 82 are connected in series with the apparatus for the electro-physical water treatment described here. No additional T-fittings in the water supply pipe like T-fitting 96 are required.

I claim:

1. An apparatus for treating water by means of an electric field, comprising: a water treatment chamber having inlet and outlet means for insertion into water conduit means to permit, when so inserted, water flow through said chamber; a cathode having a cathode surface, said cathode being arranged in said water treatment chamber such that said water flow flows over said cathode surface; said cathode having a plurality of side-by-side elongated elements; an anode spaced from the plurality of side-by-side elongated cathode elements; means for permitting a voltage to be applied between said anode and said cathode to generate an electric field between said anode and said cathode, whereby seed crystals of minerals contained in said water are deposited on said elongated elements; a perforated disc having a plurality of holes therein, said elongated elements extending through said holes of said perforated disc; and means for moving said perforated disc along said elongated elements for separating said seed crystals from said elongated elements.

2. An apparatus as claimed in claim 1, wherein said elongated elements are rigid pins having a surface and carried by a base.

3. An apparatus as claimed in claim 2, wherein said inlet and said outlet define a direction of flow of said water in said treatment chamber, said pins of said cathode extending in said direction of flow and said holes of said perforated disc having a larger diameter than said pins and forming flow passage reducing means for transiently increasing the flow velocity at said surface of said pins as the water flows through the holes.

4. An apparatus as claimed in claim 3, wherein said holes in said perforated disc are nozzle-shaped tapering to the downstream openings of said holes.

5. An apparatus as claimed in claim 3, wherein said perforated disc is movable between an upstream end position, in which said pins extend through said holes substantially with their whole lengths, and a downstream position and further comprising spring means for urging said perforated disc into said upstream position, said spring means being dimensioned to permit water pressure acting on said disc, when water flows through the apparatus, to move said perforated disc to its second end position against the action of said spring means.

6. An apparatus as claimed in claim 5, wherein said perforated disc, in its downstream position, is located downstream of said pins.

7. An apparatus for treating water by means of an electric field, comprising: a water treatment chamber having inlet and outlet means for insertion into water conduit means to permit, when so inserted, water flow through said chamber; a cathode having a cathode surface, said cathode being arranged in said water treatment chamber such that said water flow flows over said cathode surface; an anode; means for permitting a voltage to be applied between said anode and said cathode to generate an electric field between said anode and said cathode, whereby seed crystals of minerals contained in said water are deposited on said cathode surface; separating means for separating said seed crystals from said cathode surface; electric motor means for moving said separating means over said cathode surface to separate said seed crystals therefrom; shut-off valve means governing said water flow through the apparatus; and monitoring means for monitoring said water flow in accordance with predetermined safety criteria to avoid damages by said water flow, said shut-off valve means being arranged to be actuated by said electric motor means, said electric motor means being controlled by said monitoring means to close said shut-off valve, when said monitoring means respond.

8. An apparatus as claimed in claim 7, wherein said cathode has a plurality of parallel pins forming a pin pattern, said separating means comprising a perforated disc with a pattern of holes corresponding to said pin pattern, said pins extending through said holes; and said perforated disc being driven by said electric motor means to move over said pins.

9. An apparatus as claimed in claim 8, wherein said inlet means and said outlet means define a direction of flow of said water in said treatment chamber, said direction of flow being transverse to said pins.

10. An apparatus as claimed in claim 7, wherein said electric motor means comprise a reversible motor, said motor being coupled with said separating means for driving said separating means in a first direction of rotation; and being coupled with said shut-off valve means through unidirectional clutch means for driving said shut-off valve in a second, opposite direction, said electric motor means being reversible by said monitoring means from said first direction of rotation to said second direction of rotation, when said monitoring means respond.

11. An apparatus as claimed in claim 7, and further comprising a flow meter arranged in the path of said water flow and providing a flow measured value indicative of the flow rate of said water flow, said flow measured value being applied, on one hand, to said monitoring device for testing, whether or not one of said sax safety criteria causing said monitoring means to respond is applicable, and, on the other hand, to switching means for applying a voltage between said cathode and said anode in said treatment chamber, when a water flow is detected by said flow meter.

12. An apparatus as claimed in claim 11, wherein said electric motor means are controlled by said flow meter to vary the speed of said motor means depending on said flow measured value, whereby the speed of the separating means is increased, when the water flow rate is increased.

13. An apparatus for treating water by means of an electric field, comprising: a water treatment chamber having inlet and outlet means for insertion into water conduit means to permit, when so inserted, water flow through said chamber; a cathode having a plurality of parallel pins forming a pin pattern and forming a cathode surface, said cathode being arranged in said water treatment chamber such that said water flow flows over said cathode surface; an anode; means for permitting a voltage to be applied between said anode and said cathode to generate an electric field between said anode and said cathode, whereby seed crystals of minerals contained in said water are deposited on said cathode surface; separating means for separating said seed crystals from said cathode surface, said separating means comprising a perforated disc with a pattern of holes corresponding to said pin pattern; electric motor means for moving said perforated disc over said pins forming said cathode surface to separate seed crystals therefrom; a transmission between said electric motor means and said perforated disc, said transmission including an eccentric cam driven by said electric motor means, a push rod and a return spring, said push rod being urged by said return spring into engagement with said cam and being connected with said perforated disc; shut-off valve means governing said water flow through the apparatus; and monitoring means for monitoring said water flow in accordance with predetermined safety criteria to avoid damages by said water flow, said shut-off valve means being arranged to be actuated by said electric motor means, said electric motor means being controlled by said monitoring means to close said shut-off valve, when said monitoring means respond.

14. An apparatus for treating water by means of an electric field, comprising: a water treatment chamber having inlet and outlet means for insertion into water conduit means to permit, when so inserted, water flow through said chamber; a cathode having a cathode surface, said cathode being arranged in said water treatment chamber such that said water flow flows over said cathode surface; an anode; means for permitting a voltage to be applied between said anode and said cathode to generate an electric field between said anode and said cathode, whereby seed crystals of minerals contained in said water are deposited on said cathode surface, separating means for separating said seed crystals from said cathode surface, electric motor means for moving said separating means over said cathode surface to separate seed crystals therefrom; shut-off valve means governing said water flow through the apparatus; monitoring means for monitoring said water flow in accordance with predetermined safety criteria to avoid damages by said water flow, said shut-off valve means being arranged to be actuated by said electric motor means, said electric motor means being controlled by said monitoring means to close said shut-off valve, when said monitoring means respond; and a fitting part having a conduit body, said conduit body having a first connecting socket, a second connecting socket and a third connecting socket, each connecting socket defining two coaxial inner and outer conduits; said first connecting socket being adapted for connection to a T-fitting connecting socket of a T-fitting to be installed in a water supply pipe, said T-fitting connecting socket having an inner and an outer conduit, said inner conduit of said T-fitting connecting socket communicating with a first supply pipe connecting socket of said T-fitting, and said outer conduit of said T-fitting connecting socket communicating with a second supply pipe connecting socket aligned with said first supply pipe connecting socket; the outer conduit of said second connecting socket of said conduit body communicating with said inlet means of said treatment chamber, the inner conduit of said third connecting socket of said conduit body communicating with said outlet means of said treatment chamber, the inner conduit of said second connecting socket communicating with the inner conduit of said first connecting socket, and the outer conduit of said third connecting socket communicating with the outer conduit of said first connecting socket.

15. An apparatus as claimed in claim 14, wherein said first, second and third connecting sockets of said conduit body are arranged in the form of a "Y".

16. An apparatus as claimed in claim 14, wherein said shut-off valve means govern the inner conduit of said second connecting socket of said conduit body.

17. An apparatus as claimed in claim 16, wherein said shut-off valve means comprise a ball valve.

18. An apparatus for treating drinking water by means of an electric field, comprising a water treatment chamber having inlet and outlet means for insertion into water conduit means to permit, when so inserted, water flow through said chamber; a cathode having a base plate and plurality of parallel pins thereon forming a pin pattern and defining a cathode surface, said cathode being arranged in said water treatment chamber such that said water flow flows over said cathode surface; an anode means located opposite said pin pattern for permitting a voltage to be applied between said anode and said cathode to generate an inhomogeneous electric field between said anode and said cathode, whereby seed crystals of minerals contained in said water are deposited on said pins; a perforated disc with a pattern of holes corresponding to said pin pattern, said pins extending through said holes of said perforated disc; and means for moving said perforated disc along said elongated elements to separate said seed crystals from said pins.

* * * * *